Jan. 24, 1961 J. V. KRAMER 2,968,912
CHAIN HOLDING TOOL
Filed March 11, 1958 2 Sheets-Sheet 1

John V. Kramer
INVENTOR.

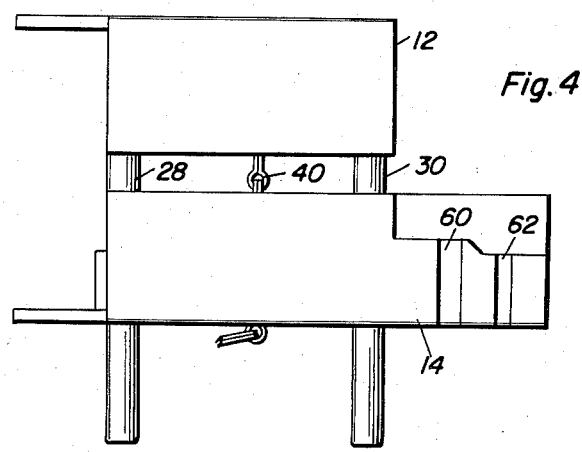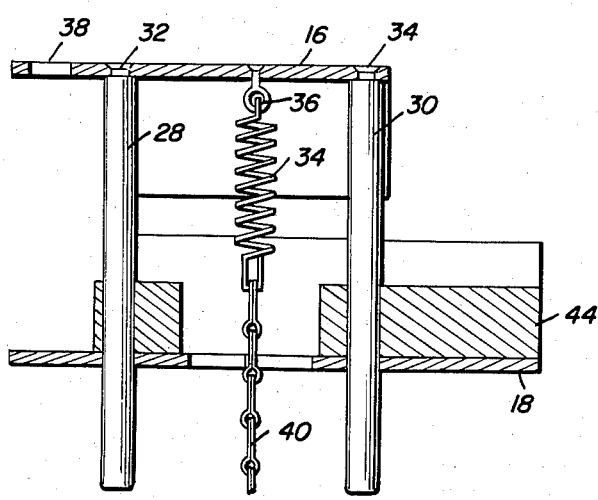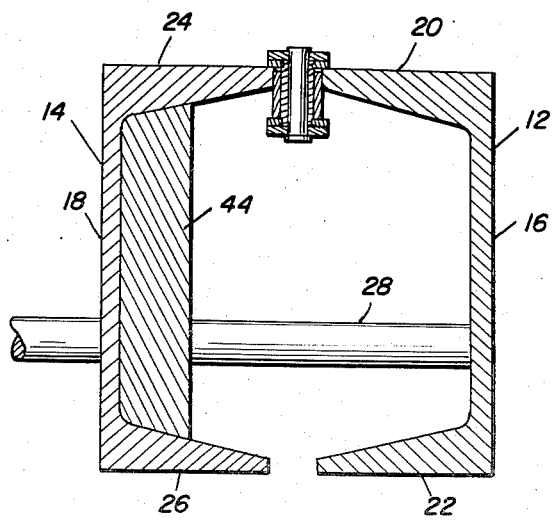

United States Patent Office 2,968,912
Patented Jan. 24, 1961

2,968,912
CHAIN HOLDING TOOL
John V. Kramer, 423 N. Grange Ave., Sioux Falls, S. Dak., assignor of one-tenth to Willard Rood, Sioux Falls, S. Dak.
Filed Mar. 11, 1958, Ser. No. 720,622
2 Claims. (Cl. 59—5)

This invention relates very generally to tools and more particularly to a novel and improved tool construction utilized for easily attaching and detaching elements of a roller chain and for attaching and detaching individual links of a link chain.

It is often necessary and desirable to either shorten or lengthen chains. Chains are utilized for innumerable purposes and functions and each of the various uses necessarily require a chain of a specific length. Since the advantages of chains, over a fixed length flexible cable, is that the length of the chain may be varied by adding or subtracting elements, it is desirable to develop convenient and practical means for attaching and detaching the elements. It is therefore a principal object of this invention to provide a novel and improved tool which enables various types and sizes of chains to be held in position whereby the chain elements may be attached or detached utilizing a conventional hammer and punch.

It is a further object of this invention to provide a novel and improved tool construction which is light in weight so that it can easily be carried in a conventional tool kit.

It is a still further object of this invention to provide a novel and improved tool construction which is free from complexity and precision so that while being efficient and reliable, it is easy to repair and uneffected by adverse environmental conditions such as dust, grit, etc.

It is a still further object of this invention to provide a novel and improved tool construction which will accommodate various size roller chains and link chains.

It is a still further object of this invention to provide a novel and improved tool construction which is relatively inexpensive to manufacture considering the function accomplished.

In accordance with the above stated objects, below is clearly and specifically described a novel and improved construction in a tool device utilized for holding various size roller chains and link chains whereby elements may be easily attached and detached employing only a conventional hammer and punch. The roller chain is held between opposed legs of a pair of channel-shaped jaw members which are adjustably related in that one of said jaw members has perpendicularly affixed thereto a pair of guides which are slidably accommodated in apertures in the second of said jaw members. A spring is dependingly supported from one of the jaw members and has a chain attached at its free end. The chain is retained at any part along the length thereof in a passage in the opposed jaw member. The roller elements therefor may be gripped between the pair of resiliently urged jaw members in such a position that the pivots connecting the rollers may be easily removed by a punch and hammer. A plurality of slots in the bight and leg portion of one of the jaw members accommodates various size links of a link chain and retains them in a position where they too may be easily attached and detached utilizing a hammer.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 4 is a further elevational side view illustrating the invention in the absence of the chain;

Figure 5 is a sectional view taken substantially along the plane 5—5 of Figure 3;

Figure 6 is a sectional view taken substantially along the plane 6—6 of Figure 1.

Figure 1:
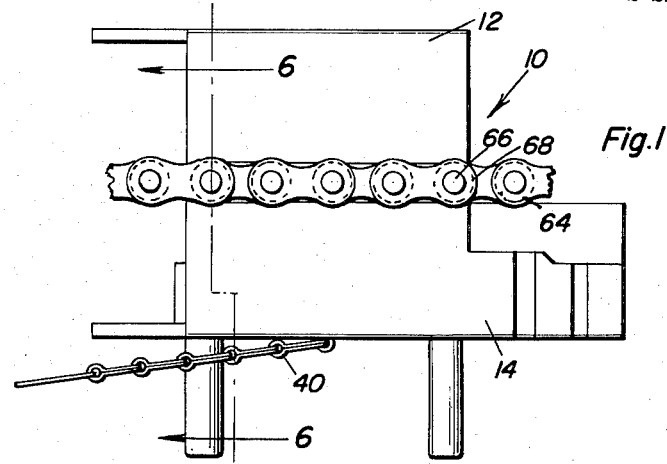
Figure 1 is a side elevational view of the invention shown being utilized with the roller chain.

With continuing reference to the drawings, the numeral 10 generally represents the chain holding device comprising this invention having a first jaw member 12 and a second opposed jaw member 14. Each of the opposed jaw members 12 and 14 is of channel shape and includes respective bight portions 16 and 18 and respective leg portions 20, 22 and 24, 26. The bight portion 16 of jaw member 12 has a pair of perpendicular guides 28 and 30 attached to the undersurface thereof. The guides 28 and 30 are attached to the bight portion 16 by a pair of countersunk screws 32 and 34. Furthermore, a spring 34 is dependingly supported from an eye 36 which is fixed to the bight portion 16 of jaw member 12 as by a cotter pin or a countersunk screw threadedly engaged with a hollow shank portion of the eye 36. An aperture 38 is shown in the extension of the bight portion 16. The aperture 38 may be utilized for various functions such as hanging the device 10 on a hook or fixing the device 10 to a surface as by a screw. The spring 34 has a chain 40 affixed to the free end of the spring and further has a ring 42 connected to the chain 40 at its free end.

The jaw member 14 has a block 44 affixed to the bight portion 18 by countersunk screws 46 and 48 between the leg portions 24 and 26. A pair of spaced apertures 50 and 52 extend through the bight portion 18 and block 44 and slidably accommodate the guides 28 and 30. The bight portion 18 further contains T-shaped passage 54 which extends through the block 44 and has a wide cross portion 56 and a narrow vertical portion 58. The cross portion 56 is large enough so as to receive the ring 42 and chain 40 therethrough while the vertical portion 58 is narrow enough so as to retain the links 40 at any point along the length of the chain 40.

Figure 3:
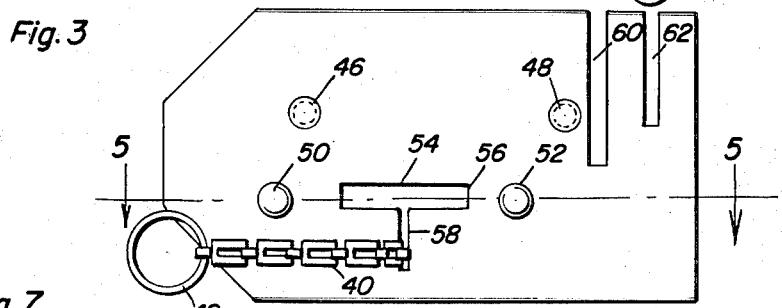
Figure 3 is an elevational bottom view.

The leg and bight portion 24 and 18 respectively of jaw member 14 and block 44 have slots 60 and 62 which extend therethrough. The slots are of different depths as shown in Figure 3 so as to accommodate different size links of various link chains.

In the operation and utilization of this invention, the jaw members 12 and 14 are separated by a sliding movement of jaw member 14 on guides 28 and 30 in apertures 50 and 52. A roller chain 64 is placed between two opposing leg portions 20 and 24 of the jaw members 12 and 14 respectively. The jaw 14 is then slid toward jaw 12 and chain 40 which is pulled to tension spring 34. The chain 40 extends through the passage 54 and when the proper tension is created in spring 34 establishing a satisfactory tight grip on the roller chain 64, the chain 40 is maintained in the narrow vertical portion of the passage 58. With the roller chain 64 held as shown in Figure 1, a conventional hammer and punch may be utilized to remove pins 66 from the roller elements. The pin 66, of course, acts to maintain the tie bars 68 to adjacent roller elements to establish the chain relationship.

Figure 2:
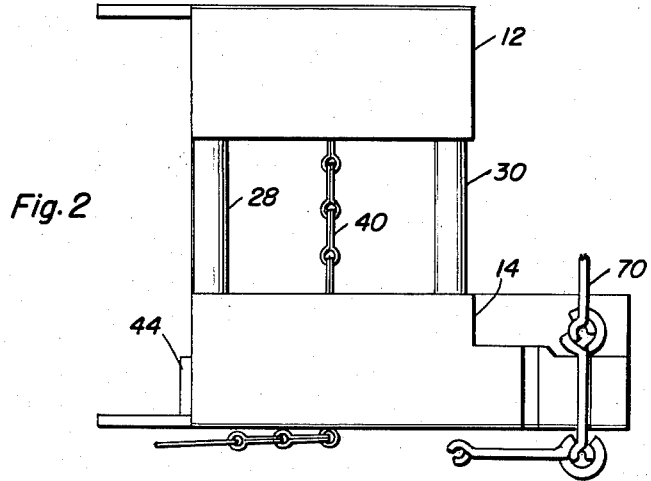
Figure 2 is another side elevational view of the invention illustrated with the opposed jaws separated and shown accommodating the elements of a link chain.
Figure 7:
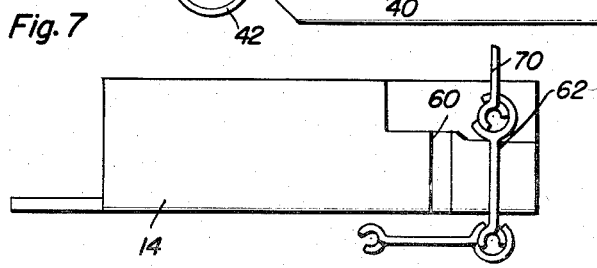
Figure 7 is an elevational side view showing the bottom jaw member accommodating the link.

To attach or detach elements of a link chain 70 an individual link is placed on a slot as 62 in the bottom jaw member 14 and is held in the position shown in Figure 2 so that again a conventional hammer may be utilized to disconnect adjacent links. It is to be noted that Figure 7 illustrates the jaw member 14 withdrawn from the guides 28 and 30 and separated completely from the opposed jaw member 12. Figure 7 illustrates the proper functioning of the jaw member 14 alone for utilization with a link chain 70 when the use of the opposed jaws is considered unnecessary. That is, when the jaws are not intended to be utilized on roller chain as 64. Furthermore, where space requirements limit the available working space, the bottom jaw 14 will adequately function alone. It is to be noted, however, that the invention comprises a unitary device capable of performing identical functions on various type chains.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A chain holding device comprising a first jaw member, a second jaw member, said jaw members positioned in opposed relationship, guide means including a pair of spaced elongated guides perpendicularly affixed to said first jaw member and extending toward said second jaw member, apertures in said second jaw member, said guides freely slidably received in said apertures whereby said jaw members may be moved relative to each other, said first jaw member dependingly supporting a spring therefrom extending toward said second jaw member, a chain terminally attached to the free end of the spring, a T-shaped passage in said second jaw member, the head portion of said T-shaped passage slidably receiving said chain therethrough, the stem portion of said T-shaped passage comprising means for engaging said chain with said second jaw member in said passage at spaced points along the length thereof for establishing a connection between said first and second jaw members, said jaw members being free of any other connections therebetween whereby said jaw members may be separated upon release of said engagement, said connection continually resiliently urging said jaws together, said second jaw member having a block affixed thereto, a plurality of aligned slots defined in said block whereby said plurality of slots may receive a plurality of various size link chains.

2. A chain holding device comprising a first jaw member, a second jaw member, said jaw members positioned in opposed relationship, guide means including a pair of spaced elongated guides perpendicularly affixed to said first jaw member and extending toward said second jaw member, apertures in said second jaw member, said guides freely slidably received in said apertures whereby said jaw members may be moved relative to each other, said first jaw member dependingly supporting a spring therefrom extending toward said second jaw member, a chain terminally attached to the free end of the spring, a T-shaped passage in said second jaw member, the head portion of said T-shaped passage slidably receiving said chain therethrough, the stem portion of said T-shaped passage comprising means for engaging said chain with said second jaw member in said passage at spaced points along the length thereof for establishing a connection between said first and second jaw members, said jaw members being free of any other connections therebetween whereby said jaw members may be separated upon release of said engagement, said connection continually resiliently urging said jaws together, said first jaw member being channel-shaped and including a bight portion and two leg portions, said second jaw member being channel-shaped and including a bight portion and two leg portions, the respective leg portions of the jaw members being opposed and defining therebetween a roller chain holding area being urged closed by said spring, said second jaw member having a block affixed to the bight portion between the leg portions and a plurality of aligned slots through said block, bight portion, and leg portion, for accommodating a plurality of various sized link chains.

References Cited in the file of this patent

UNITED STATES PATENTS

| 1,794,397 | Brown | Mar. 3, 1931 |
| 1,806,682 | Heiny et al. | May 26, 1931 |
| 1,915,847 | Brant | June 27, 1933 |
| 1,933,718 | Devincenzi | Nov. 7, 1933 |
| 2,207,892 | Mullaney | July 16, 1940 |
| 2,261,055 | Dulaney | Oct. 28, 1941 |
| 2,628,397 | Olson | Feb. 17, 1953 |

FOREIGN PATENTS

| 675,797 | Germany | May 17, 1939 |